a12) United States Patent
Clemens et al.

(10) Patent No.: US 7,940,159 B2
(45) Date of Patent: May 10, 2011

(54) IDENTIFICATION SYSTEM

(75) Inventors: Wolfgang Clemens, Puschendorf (DE);
Walter Fix, Nuremberg (DE); Andreas Ullmann, Zirndorf (DE); Werner Reinhart, Zirndorf (DE); Beate Reinhart, legal representative, Zirndorf (DE)

(73) Assignees: PolyIC GmbH & Co. KG, Furth (DE);
Leonhard Kurz Stiftung & Co. KG, Furth (DE)

( * ) Notice: Subject to any disclaimer, the term of this patent is extended or adjusted under 35 U.S.C. 154(b) by 773 days.

(21) Appl. No.: 11/721,219

(22) PCT Filed: Dec. 6, 2005

(86) PCT No.: PCT/DE2005/002197
§ 371 (c)(1),
(2), (4) Date: Nov. 29, 2007

(87) PCT Pub. No.: WO2006/061002
PCT Pub. Date: Jun. 15, 2006

(65) Prior Publication Data
US 2009/0237248 A1 Sep. 24, 2009

(30) Foreign Application Priority Data
Dec. 10, 2004 (DE) .......................... 10 2004 059 465

(51) Int. Cl.
G08B 13/14 (2006.01)
G08B 5/22 (2006.01)
G08C 19/00 (2006.01)
G07F 7/12 (2006.01)

(52) U.S. Cl. ................ 340/5.2; 340/825.69; 340/825.72; 340/825.36; 340/825.45; 340/407.1; 340/5.1; 340/5.21; 340/5.8; 340/5.86; 340/572.1

(58) Field of Classification Search .................. None
See application file for complete search history.

(56) References Cited

U.S. PATENT DOCUMENTS

| 3,512,052 A | 5/1970 | MacIver et al. |
| 3,769,096 A | 10/1973 | Ashkin |
| 3,955,098 A | 5/1976 | Kawamoto |

(Continued)

FOREIGN PATENT DOCUMENTS
DE 2102735 8/1972
(Continued)

OTHER PUBLICATIONS

U.S. Appl. No. 10/344,926, filed Feb. 12, 2004, Adolf Bernds et al.
(Continued)

*Primary Examiner* — Julie Lieu
(74) *Attorney, Agent, or Firm* — Carella, Byrne et al.; Elliot M. Olstein; William Squire

(57) ABSTRACT

The invention relates to a security element in the form of a flexible, multilayer film body and to an identification system comprising a security element of this type. The security element has a receiving unit (61) for receiving an electromagnetic verification signal (7) containing a specific coding from a verification device, an output unit (66) for outputting an enable signal, and an electronic release system (63, 64, 65) having active and/or passive organic components. The electronic release system (63, 64, 65) checks whether or not a signal received by the receiving unit contains the specific coding, and drives the output unit (66) for outputting the enable signal if the signal received by the receiving unit (61) contains the specific coding.

19 Claims, 2 Drawing Sheets

U.S. PATENT DOCUMENTS

| | | | |
|---|---|---|---|
| 3,999,122 A | 12/1976 | Winstel et al. |
| 4,246,298 A | 1/1981 | Guarnery |
| 4,302,648 A | 11/1981 | Sado et al. |
| 4,340,057 A | 7/1982 | Bloch |
| 4,442,019 A | 4/1984 | Marks |
| 4,554,229 A | 11/1985 | Small |
| 4,865,197 A | 9/1989 | Craig |
| 4,926,052 A | 5/1990 | Hatayama |
| 4,937,119 A | 6/1990 | Nickles et al. |
| 5,075,816 A | 12/1991 | Stormbom |
| 5,173,835 A | 12/1992 | Cornett et al. |
| 5,206,525 A | 4/1993 | Yamamoto et al. |
| 5,259,926 A | 11/1993 | Kuwabara et al. |
| 5,321,240 A | 6/1994 | Takahira |
| 5,347,144 A | 9/1994 | Garnier et al. |
| 5,364,735 A | 11/1994 | Akamatsu |
| 5,395,504 A | 3/1995 | Hoffman et al. |
| 5,480,839 A | 1/1996 | Ezawa et al. |
| 5,486,851 A | 1/1996 | Gehner et al. |
| 5,502,396 A | 3/1996 | Desarzens |
| 5,528,222 A | 6/1996 | Moskowitz |
| 5,546,889 A | 8/1996 | Wakita et al. |
| 5,569,879 A | 10/1996 | Gloton |
| 5,574,291 A | 11/1996 | Dodabalapur et al. |
| 5,578,513 A | 11/1996 | Maegawa |
| 5,580,794 A | 12/1996 | Allen |
| 5,625,199 A | 4/1997 | Baumbach et al. |
| 5,629,530 A | 5/1997 | Brown et al. |
| 5,630,986 A | 5/1997 | Charlton |
| 5,652,645 A | 7/1997 | Jain |
| 5,691,089 A | 11/1997 | Smayling |
| 5,693,956 A | 12/1997 | Shi |
| 5,705,826 A | 1/1998 | Aratani et al. |
| 5,729,428 A | 3/1998 | Sakata et al. |
| 5,854,139 A | 12/1998 | Kondo et al. |
| 5,869,972 A | 2/1999 | Birch et al. |
| 5,883,397 A | 3/1999 | Isoda et al. |
| 5,892,244 A | 4/1999 | Tanaka et al. |
| 5,946,551 A | 8/1999 | Dimitrakopoulos |
| 5,967,048 A | 10/1999 | Fromson et al. |
| 5,970,318 A | 10/1999 | Choi et al. |
| 5,973,598 A * | 10/1999 | Beigel ..................... 340/572.1 |
| 5,994,773 A | 11/1999 | Hirakawa |
| 5,997,817 A | 12/1999 | Crismore et al. |
| 5,998,805 A | 12/1999 | Shi et al. |
| 6,036,919 A | 3/2000 | Thym et al. |
| 6,045,977 A | 4/2000 | Chandross et al. |
| 6,060,338 A | 5/2000 | Tanaka et al. |
| 6,072,716 A | 6/2000 | Jacobsen et al. |
| 6,083,104 A | 7/2000 | Choi |
| 6,087,196 A | 7/2000 | Sturm et al. |
| 6,133,835 A | 10/2000 | DeLeeuw et al. |
| 6,150,668 A | 11/2000 | Bao |
| 6,180,956 B1 | 1/2001 | Chondroudis |
| 6,197,663 B1 | 3/2001 | Chandross |
| 6,207,472 B1 | 3/2001 | Calligari et al. |
| 6,215,130 B1 | 4/2001 | Dodabalapur |
| 6,221,553 B1 | 4/2001 | Wolk |
| 6,251,513 B1 | 6/2001 | Rector |
| 6,284,562 B1 | 9/2001 | Batlogg et al. |
| 6,291,126 B2 | 9/2001 | Wolk et al. |
| 6,300,141 B1 | 10/2001 | Segal et al. |
| 6,321,571 B1 | 11/2001 | Themont et al. |
| 6,322,736 B1 | 11/2001 | Bao |
| 6,329,226 B1 | 12/2001 | Jones |
| 6,330,464 B1 | 12/2001 | Colvin |
| 6,335,539 B1 | 1/2002 | Dimitrakopoulos et al. |
| 6,336,017 B1 | 1/2002 | Miyamoto et al. |
| 6,340,822 B1 | 1/2002 | Brown et al. |
| 6,344,662 B1 | 2/2002 | Dimitrakopoulos et al. |
| 6,362,509 B1 | 3/2002 | Hart |
| 6,384,804 B1 | 5/2002 | Dodabalapur et al. |
| 6,403,396 B1 | 6/2002 | Gudesen et al. |
| 6,429,450 B1 | 8/2002 | Mutsaers et al. |
| 6,498,114 B1 | 12/2002 | Amundson et al. |
| 6,517,955 B1 | 2/2003 | Takada et al. |
| 6,518,949 B2 | 2/2003 | Drzaic |
| 6,521,109 B1 | 2/2003 | Bartic et al. |
| 6,548,875 B2 | 4/2003 | Nishiyama |
| 6,555,840 B1 | 4/2003 | Hudson |
| 6,593,690 B1 | 7/2003 | McCormick |
| 6,603,139 B1 | 8/2003 | Tessler |
| 6,621,098 B1 | 9/2003 | Jackson |
| 6,852,583 B2 | 2/2005 | Bernds et al. |
| 6,903,958 B2 | 6/2005 | Bernds et al. |
| 6,918,535 B1 * | 7/2005 | Brosow ..................... 235/379 |
| 6,960,489 B2 | 11/2005 | Bernds et al. |
| 6,975,221 B2 * | 12/2005 | Monck ................. 340/539.11 |
| 7,504,953 B2 * | 3/2009 | Forster ..................... 340/572.8 |
| 7,737,851 B2 * | 6/2010 | Trosper ..................... 340/572.1 |
| 2001/0026187 A1 | 10/2001 | Oku |
| 2001/0046081 A1 | 11/2001 | Hayashi et al. |
| 2002/0018911 A1 | 2/2002 | Bernius et al. |
| 2002/0022284 A1 | 2/2002 | Heeger |
| 2002/0025391 A1 | 2/2002 | Angelopoulos |
| 2002/0053320 A1 | 5/2002 | Duthaler |
| 2002/0056839 A1 | 5/2002 | Joo et al. |
| 2002/0068392 A1 | 6/2002 | Lee et al. |
| 2002/0130042 A1 | 9/2002 | Moerman et al. |
| 2002/0140557 A1 * | 10/2002 | Dukler et al. ............. 340/572.1 |
| 2002/0170897 A1 | 11/2002 | Hall |
| 2002/0195644 A1 | 12/2002 | Dodabalapur et al. |
| 2003/0059987 A1 | 3/2003 | Sirringhaus Henning et al. |
| 2003/0070500 A1 | 4/2003 | Hung |
| 2003/0112576 A1 | 6/2003 | Brewer et al. |
| 2003/0141807 A1 | 7/2003 | Kawase |
| 2003/0178620 A1 | 9/2003 | Bernds et al. |
| 2004/0002176 A1 | 1/2004 | Xu |
| 2004/0013982 A1 | 1/2004 | Jacobson et al. |
| 2004/0026689 A1 | 2/2004 | Bernds et al. |
| 2004/0084670 A1 | 5/2004 | Tripsas et al. |
| 2004/0211329 A1 | 10/2004 | Funahata et al. |
| 2004/0233065 A1 * | 11/2004 | Freeman ................. 340/825.49 |
| 2004/0256467 A1 | 12/2004 | Clemens et al. |
| 2005/0161501 A1 | 7/2005 | Giering et al. |
| 2005/0211785 A1 * | 9/2005 | Ferber et al. ............... 235/492 |
| 2008/0067247 A1 * | 3/2008 | McGregor et al. ......... 235/439 |

FOREIGN PATENT DOCUMENTS

| | | |
|---|---|---|
| DE | 33 38 597 | 5/1985 |
| DE | 41 03 675 | 8/1992 |
| DE | 692 32 740 T2 | 4/1993 |
| DE | 42 43 832 | 6/1994 |
| DE | 43 12 766 | 10/1994 |
| DE | 196 29 291 | 1/1997 |
| DE | 195 06 907 | 9/1998 |
| DE | 198 52 312 | 5/1999 |
| DE | 198 16 860 | 11/1999 |
| DE | 199 18 193 | 11/1999 |
| DE | 198 51 703 | 5/2000 |
| DE | 100 06 257 | 9/2000 |
| DE | 199 21 024 | 11/2000 |
| DE | 199 33 757 | 1/2001 |
| DE | 695 19 782 | 1/2001 |
| DE | 199 35 527 | 2/2001 |
| DE | 199 37 262 | 3/2001 |
| DE | 100 12 204 | 9/2001 |
| DE | 100 33 112 | 1/2002 |
| DE | 201 11 825 | 2/2002 |
| DE | 100 43 204 | 4/2002 |
| DE | 100 45 192 | 4/2002 |
| DE | 100 47 171 | 4/2002 |
| DE | 100 58 559 | 5/2002 |
| DE | 100 61 297 | 6/2002 |
| DE | 101 17 663 | 10/2002 |
| DE | 101 20 687 | 10/2002 |
| DE | 101 20 686 | 11/2002 |
| DE | 101 51 440 | 2/2003 |
| DE | 101 41 440 | 3/2003 |
| DE | 101 63 267 | 7/2003 |
| DE | 102 09 400 | 10/2003 |
| DE | 102 19 905 | 12/2003 |
| DE | 103 41 962 | 4/2004 |
| DE | 699 13 745 | 10/2004 |
| EP | 0 108 650 | 5/1984 |
| EP | 0 128 529 | 12/1984 |
| EP | 0 268 370 A2 | 5/1988 |

| | | |
|---|---|---|
| EP | 0 268 370 A3 | 5/1988 |
| EP | 0 350 179 | 1/1990 |
| EP | 0 418 504 | 3/1991 |
| EP | 0 442 123 | 8/1991 |
| EP | 0 460 242 | 12/1991 |
| EP | 0 501 456 A2 | 9/1992 |
| EP | 0 501 456 A3 | 9/1992 |
| EP | 0 511 807 | 11/1992 |
| EP | 0 528 662 | 2/1993 |
| EP | 0 603 939 A2 | 6/1994 |
| EP | 0 615 256 | 9/1994 |
| EP | 0 685 985 | 12/1995 |
| EP | 0 716 458 A2 | 6/1996 |
| EP | 0 716 458 A3 | 6/1996 |
| EP | 0 785 578 A2 | 7/1997 |
| EP | 0 785 578 A3 | 7/1997 |
| EP | 0 786 820 | 7/1997 |
| EP | 0 690 457 | 12/1999 |
| EP | 0 962 984 A2 | 12/1999 |
| EP | 0 962 984 A3 | 12/1999 |
| EP | 0 966 182 | 12/1999 |
| EP | 0 979 715 | 2/2000 |
| EP | 0 981 165 | 2/2000 |
| EP | 0 989 614 A2 | 3/2000 |
| EP | 1 048 912 | 11/2000 |
| EP | 1 052 594 | 11/2000 |
| EP | 1 065 725 A2 | 1/2001 |
| EP | 1 065 725 A3 | 1/2001 |
| EP | 1 083 775 | 3/2001 |
| EP | 1 102 335 A2 | 5/2001 |
| EP | 1 103 916 | 5/2001 |
| EP | 1 104 035 A2 | 5/2001 |
| EP | 1 113 502 | 7/2001 |
| EP | 1 134 694 | 9/2001 |
| EP | 1 170 851 | 1/2002 |
| EP | 1 224 999 | 7/2002 |
| EP | 1 237 207 | 9/2002 |
| EP | 1 296 280 | 3/2003 |
| EP | 1 318 084 | 6/2003 |
| FR | 2793089 | 11/2000 |
| GB | 723598 | 2/1955 |
| GB | 2 058 462 | 4/1981 |
| JP | 54069392 | 6/1979 |
| JP | 60117769 | 6/1985 |
| JP | 61001060 | 1/1986 |
| JP | 61167854 | 7/1986 |
| JP | 62065472 A | 3/1987 |
| JP | 362065477 A | 3/1987 |
| JP | 63205943 | 8/1988 |
| JP | 01169942 | 7/1989 |
| JP | 2969184 | 12/1991 |
| JP | 03290976 A | 12/1991 |
| JP | 05152560 | 6/1993 |
| JP | 05259434 | 10/1993 |
| JP | 05347422 | 12/1993 |
| JP | 08197788 | 8/1995 |
| JP | 09083040 | 3/1997 |
| JP | 09320760 | 12/1997 |
| JP | 10026934 | 1/1998 |
| JP | 2001085272 | 3/2001 |
| WO | WO 93/16491 | 8/1993 |
| WO | WO 94/17556 | 8/1994 |
| WO | WO 95/06240 | 3/1995 |
| WO | WO 95/31831 | 11/1995 |
| WO | WO 96/02924 | 2/1996 |
| WO | WO 96/19792 | 6/1996 |
| WO | WO 97/12349 | 4/1997 |
| WO | WO 97/18944 | 5/1997 |
| WO | WO 98/18156 | 4/1998 |
| WO | WO 98/18186 | 4/1998 |
| WO | WO 98/40930 | 9/1998 |
| WO | WO 99/07189 | 2/1999 |
| WO | WO 99/10929 | 3/1999 |
| WO | WO 99/10939 | 3/1999 |
| WO | WO 99/21233 | 4/1999 |
| WO | WO 99/30432 | 6/1999 |
| WO | WO 99/39373 | 8/1999 |
| WO | WO 99/40631 | 8/1999 |
| WO | WO 99/53371 | 10/1999 |
| WO | WO 99/54842 | 10/1999 |
| WO | WO 99/54936 | 10/1999 |
| WO | WO 99/66540 | 12/1999 |
| WO | WO 00/07151 | 2/2000 |
| WO | WO 00/33063 | 6/2000 |
| WO | WO 00/36666 | 6/2000 |
| WO | WO 00/79617 | 12/2000 |
| WO | WO 01/03126 | 1/2001 |
| WO | WO 01/06442 | 1/2001 |
| WO | WO 01/08241 | 2/2001 |
| WO | WO 01/15233 | 3/2001 |
| WO | WO 01/17029 | 3/2001 |
| WO | WO 01/17041 | 3/2001 |
| WO | WO 01/27998 | 4/2001 |
| WO | WO 01/46987 | 6/2001 |
| WO | WO 01/47044 A2 | 6/2001 |
| WO | WO 01/47044 A3 | 6/2001 |
| WO | WO 01/47045 | 6/2001 |
| WO | WO 01/69517 | 9/2001 |
| WO | WO 01/73109 A2 | 10/2001 |
| WO | WO 01/73109 A3 | 10/2001 |
| WO | WO 02/05360 | 1/2002 |
| WO | WO 02/05361 | 1/2002 |
| WO | WO 02/15264 | 2/2002 |
| WO | WO 02/17233 | 2/2002 |
| WO | WO 02/19443 | 3/2002 |
| WO | WO 02/21612 | 3/2002 |
| WO | WO 02/29912 | 4/2002 |
| WO | WO 02/43071 | 5/2002 |
| WO | WO 02/47183 | 6/2002 |
| WO | WO 02/065557 A1 | 8/2002 |
| WO | WO 02/071139 | 9/2002 |
| WO | WO 02/071505 | 9/2002 |
| WO | WO 02/076924 | 10/2002 |
| WO | WO 02/091495 A2 | 11/2002 |
| WO | WO 02/091495 A3 | 11/2002 |
| WO | WO 02/095805 A2 | 11/2002 |
| WO | WO 02/095805 A3 | 11/2002 |
| WO | WO 02/099907 | 12/2002 |
| WO | WO 02/099908 | 12/2002 |
| WO | WO 03/027948 | 4/2003 |
| WO | WO 03/036686 | 5/2003 |
| WO | WO 03/038897 | 5/2003 |
| WO | WO 03/046922 | 6/2003 |
| WO | 03054807 A2 | 7/2003 |
| WO | WO 03/057501 | 7/2003 |
| WO | WO 03/067680 | 8/2003 |
| WO | WO 03/069552 | 8/2003 |
| WO | WO 03/081671 | 10/2003 |
| WO | WO 03/095175 | 11/2003 |
| WO | WO 2004/032257 | 4/2004 |
| WO | WO 2004/042837 A2 | 5/2004 |
| WO | WO 2004/042837 A3 | 5/2004 |
| WO | WO 2004/047144 A2 | 6/2004 |
| WO | WO 2004/047144 A3 | 6/2004 |
| WO | WO 2004/047194 A2 | 6/2004 |
| WO | WO 2004/047194 A3 | 6/2004 |
| WO | WO 2004/083859 | 9/2004 |
| WO | WO 2005/004194 | 1/2005 |

OTHER PUBLICATIONS

U.S. Appl. No. 10/344,951, filed Feb. 12, 2004, Adolf Bernds et al.
U.S. Appl. No. 10/380,113, filed Sep. 25, 2003, Adolf Bernds et al.
U.S. Appl. No. 10/381,032, filed Feb. 12, 2004, Adolf Bernds et al.
U.S. Appl. No. 10/433,961, filed Apr. 1, 2004, Wolfgang Clemens et al.
U.S. Appl. No. 10/451,108, filed May 13, 2004, Mark Giles et al.
U.S. Appl. No. 10/473,050, filed May 20, 2004, Adolf Bernds et al.
U.S. Appl. No. 10/479,234, filed Dec. 30, 2004, Adolf Bernds et al.
U.S. Appl. No. 10/479,238, filed Oct. 20, 2004, Adolf Bernds et al.
U.S. Appl. No. 10/492,922, filed Mar. 3, 2005, Erwann Buillet et al.
U.S. Appl. No. 10/492,923, filed Dec. 23, 2004, Wolfgang Clemens et al.
U.S. Appl. No. 10/508,737, filed May 19, 2005, Adolf Bernds et al.
U.S. Appl. No. 10/517,750, filed Oct. 13, 2005, Wolfgang Clemens et al.
U.S. Appl. No. 10/523,216, filed Feb. 2, 2006, Adolf Bernds et al.

U.S. Appl. No. 10/523,487, filed Apr. 13, 2006, Wolfgang Clemens et al.
U.S. Appl. No. 10/524,646, filed May 11, 2006, Walter Fix et al.
U.S. Appl. No. 10/533,756, filed Jun. 8, 2006, Wolfgang Clemens et al.
U.S. Appl. No. 10/534,678, filed Jun. 8, 2006, Wolfgang Clemens et al.
U.S. Appl. No. 10/535,448, filed Jun. 8, 2006, W. Clemens et al.
U.S. Appl. No. 10/535,449, filed Feb. 16, 2006, Walter Fix et al.
U.S. Appl. No. 10/541,815, filed Jun. 8, 2006, Axel Gerlt et al.
U.S. Appl. No. 10/541,956, Wolfgang Clemens et al.
U.S. Appl. No. 10/541,957, filed Jul. 6, 2006, Walter Fix et al.
U.S. Appl. No. 10/543,561, Wolfgang Clemens et al.
U.S. Appl. No. 10/542,678, Adolf Bernds et al.
U.S. Appl. No. 10/542,679, filed Mar. 16, 2006, Adolf Bernds et al.
U.S. Appl. No. 10/562,989, Jurgen Ficker et al.
U.S. Appl. No. 10/562,869, Wolfram Glauert.
U.S. Appl. No. 10/569,763, Walter Fix et al.
U.S. Appl. No. 10/568,730, Wolfgang Clemens et al.
U.S. Appl. No. 10/569,233, Adolf Bernds et al.
U.S. Appl. No. 10/570,571, Clemens et al.
U.S. Appl. No. 10/585,775, Walter Fix et al.
U.S. Appl. No. 11/574,139, Jurgen Ficker et al.
U.S. Appl. No. 11/721,284, Markus Bohm et al.
U.S. Appl. No. 11/721,219, Wolfgang Clemens et al.
U.S. Appl. No. 11/721,244, Robert Blache et al.
U.S. Appl. No. 11/722,457, Markus Bohm et al.
U.S. Appl. No. 11/817,258, Andreas Ullmann et al.
U.S. Appl. No. 11/817,329, Andreas Ullmann et al.
Angelopoulos M et al., "In-Situ Radiation Induced Doping", Mol. Crystl. Liq. Cryst., 1990, vol. 189, pp. 221-225.
Assadi A, et al:, Field-Effect Mobility of Poly (3-Hexylthiophene) Dept. of Physics and Measurement Technology, Received Mar. 3, 1988; accepted for Publication May 17, 1988.
Bao, Z. et al., "High-Performance Plastic Transistors Fabricatecd by Printing Techniques", Chem. Mater vol. 9, No. 6, 1997, pp. 1299-1301.
Bao, Z. et al. "Organic and Polymeric Materials for the Fabrications of Thin Film Field-Effect Transistors", paper presented at the meeting of American Chemical Society, Division of Polymer Chemistry, XX, XX, vol. 39, No. 1, Mar. 29, 1998.
Baude P F et al, "Organic semiconductor RFID transponsers" International Electron Devices Meeting 2003. IEDM. Technical Digest. Washington, DC, Dec. 8-10, 2003, New York NY, IEEE, US Dec. 8, 2003, pp. 191-194.
Belloni, F. et al, "Parameters Optimization for Improved Dynamics of Voltage Multipliers for Space", 2004 35$^{th}$ Annual IEEE Electronics Specialists Conference, Aachen, Germany, 2004, pp. 439-442.
Brabec, C.J. et al, "Photoinduced FT-IR spectroscopy and CW-photocurrent measurements of conjugated polymers and fullerenes blended into a conventional polymer matrix", Solar Energy Materials and Solar Cells, 2000 Elsevier Science V.V., pp. 19-33.
Brabec, C.J. et al., "Photovoltaic properties of a conjugated polymer/methanofullerene composites embedded in a polystyrene matrix", Journal of Applied Physics, vol. 85, No. 9, 1999, pp. 6866-6872.
Braun D., et al, "Visible light emission from semiconducting polymer diodes", American Institute of Physics, Applied Physics Letters 58, May 6, 1991, pp. 1982-1984.
Brown, A.R. et al., "Field-effect transistors made from solution-processed organic semiconductors", Elsevier Science, S.A., Synthetic Metals 88 (1997) pp. 37-55.
Brown, A.R., "Logic Gates Made from Polymer Transistors and Their Use in Ring Oscillators", Science, vol. 270, Nov. 10, 1995, pp. 972-974.
Chen, Shiao-Shien et al:, "Deep Submicrometer Double-Gate Fully-Depleted SOI PMOS Devices: A Concise Short-Channel Effect Threshold Voltage Model Using a Quasi-2D Approach", IEEE Transaction on Electron Devices, vol. 43, No. 9, Sep. 1996.
Chen, X.L. et al., "Morphological and Transistor Studies of Organic Molecular Semiconductors with Anisotropic Electrical Characteristics", American Chemical Society, 2001, Chem. Mater. 2001, 13, 1341-1348.
Clemens, W. et al., "Vom Organischen Transistor Zum Plastik-Chip," Physik Journal, V. 2, 2003, pp. 31-36.
Collet J. et al:, Low Voltage, 30 nm Channel Length, Organic Transistors With a Self-Assembled Monolayer As Gate Insulating Films:, Applied Physics Letters, American Institute of Physics. New York, US, Bd 76, Nr. 14, Apr. 3, 2000, Seiten 1941-1943, XP000950589, ISSN:0003-6951, das gauze Dokument.
Cox, Robert W. et al., "A Minimally Intrusive, Low Cost System for Determining Indoor Air Flow Patterns", Computers in Power Electronics, 2004. IEEE Workshop on Urbana, IL Aug. 15-18, 2004, Piscataway, NJ, IEEE, Aug. 15, 2004, pp. 63-68.
Crone, B. et al, "Large-scale complementary Integrated circuits based on Organic transistors", Nature, vol. 403, Feb. 3, 2000, pp. 521-.
Crone B. K. et al., "Design and Fabrication of Organic Complementary Circuits", J. Appl. Phys. vol. 89, May 2001, pp. 5125-5132.
Dai, L. et al, Photochemical Generation of Conducting Patterns in Polybutadiene Films:, Macromolecules, vol. 29, No. 1, 1996, pp. 282-287, XP 001042019, the whole document.
Dai, L. et al., "Conjugation of Polydienes by Oxidants Other Than Iodine", Elsevier Science S.A., Synthetic Metals 86 (1997) 1893-1894.
Dai, L. et al., "$I_2$-Doping" of 1,4-Polydienes*, Elsevier Science S.A., Synthetic Metals 69 (1995), pp. 563-566.
De Leeuw C.M. et al., "Polymeric integrated circuits and light-emitting diodes", Electron Devices Meeting, 1997. Technical Digest, International, Washington, DC, USA Dec. 7-10, 1997, New York, NY, USA, IEEE, US Dec. 7, 1997.
Dodabalapur, A. et al., Organic smart pixels, American Institute of Physics, Applied Physics Letters, vol. 73, No. 2, Jul. 13, 1998, pp. 142-144.
Drury et al., "Low-Cost All-Polymer Integrated Circuits", American Institute of Physics, Applied Physics Letters, 1998, vol. 73, No. 1, pp. 108-110, Jul. 6, 1998.
Ficker, J. et al., "Dynamic and Lifetime Measurements of Polymer OFETS and Integrated Plastic Circuits," Proc. of SPIE, v. 466, 2001, pp. 95-102.
Fix, W. et al., "Fast Polymer Integrated Circuits Based on a Polyfluorene Derivative", ESSDERC 2002, 2002, pp. 527-529.
Fix, W., et al., "Fast polymer integrated circuits", American Institute of Physics, Applied Physics Letters, vol. 81, No. 89, Aug. 2002, pp. 1735-1737.
Forrest et al., "The Dawn of Organic Electronics", IEEE Spectrum, Aug. 2000, Seiten 29-34, XP002189000, IEEE Inc., New York, US ISSN:0018-9235, Seite 33, rechte Spalte, Zelle 58-Seite 34, linke Spalte, Zeile 24; Abbildung 5.
Fraunhofer Magazin- Polytronic Chips Von der Rolle, Apr. 2001, pp. 8-13.
Garbassi F., et al., "Bulk Modifications", Polymer Surfaces, John Wiley & Sons, 1998, pp. 289-300.
Garnier, F. et al, "All-Polymer Field-Effect Transistor Realized by Printing Techniques", Science, American Association for the Advancement of Science, US, vol. 265, Sep. 16, 1994, pp. 1684-1686.
Garnier et al., "Conjugated Polymers and Oligomers as Active Material for Electronic Devices", Synthetic Metals, vol. 28, 1989.
Gelinck, G.H. et al., "High-Performance All-Polymer Integrated Circuits", Applied Physics Letters, v. 77, 2000, pp. 1487-1489.
Goncalves_Conto, Sylvie, et al., "Interface Morphology in Organic Light-Emitting Diodes", Advanced Materials 1999, vol. 11, No. 2, pp. 112-115.
Gosain, D.P., "Excimer laser crystallized poly-Si TFT's on plastic substrates", Second International Symposium on Laser Precision Microfabrication, May 16-18, 2001, Singapore, vol. 4426, pp. 394-400.
Halls, J.J. M., et al., "Efficient photodiodes from interpenetrating polymer networks", Nature, vol. 376, Aug. 10, 1995, pp. 498-500.
Harsanyi G. et al, "Polytronics for biogtronics:unique possibilities of polymers in biosensors and BioMEMS", IEEE Polytronic 2002 Conference, Jun. 23, 2002, pp. 211-215.
Hart, C.M. et al, "Low-cost all-polymer integrated circuits", Solid-State Circuits Conference, 1998. EXXCIRC '98 Proceedings of the 24th European, The Hague, The Netherlands Sep. 22-24, 1998, Piscataway, NJ, USA, IEEE, Sep. 22, 1998, pp. 30-34.

Hebner, T.R. et al., Ink-jet printing of doped polymers for organic light emitting devices:, American Institute of Physics, Applied Physics Letters, vol. 72, No. 5, Feb. 2, 1998, pp. 519-521.

Hergel, H. J.: "Pld-Programmiertechnologien", Elektronik, Franzis Verlag GMBH. Munchen, DE, Bd 41, Nr. 5, Mar. 3, 1992, Seiten 44-46, XP000293121, ISSN: 0013-5658, Abbildungen 1-3.

Hwang J D et al:, "A Vertical Submicron Slc thin film transistor", Solid State Electronics, Elsevier Science Publishers, Barking, GB, Bd. 38, NR. 2, Feb. 1, 1995, Seiten 275-278, XP004014040, ISSN:0038-1101, Abbildung 2.

IBM Technical Disclosure Bulletin, "Short-Channel Field-Effect Transistor", IBM Corp., New York, US, Bd. 32, Nr. 3A, Aug. 1, 1989, Seiten 77-78, XP000049357, ISSN:0018-8689, das ganze Dokument.

Kawase, T., et al., "Inkjet Printed Via-Hole Interconnections and Resistors for All-Polymer Transistor Circuits", Advanced Materials 2001, 13, No. 21, Nov. 2, 2001, pp. 1601-1605.

Klauk, H. et al., "Pentacene Thin Film Transistors and Inverter Circuits", 1997 International Electron Devices Meeting Technical Digest, pp. 539-542, Dec. 1997.

Knobloch, A. et al., "Printed Polymer Transistors", Proc. Polytronic, v. 84, 2001, pp. 84-89.

Kobel W. et al., "Generation of Micropatterns in Poly (3-Methyl-Thiophene) Films Using Microlithography: A First Step in the Design of an All-Organic Thin-Film Transistor" Synthetic Metals, V. 22, 1988, pp. 265-271.

Koezuka, H. et al., "Macromolecular Electronic Device", Mol. Cryst. Liq. Cryst. 1994, vol. 2555, pp. 221-230.

Kumar, Anish et al:, "Kink-Free Polycrystalline Silicon Double-Gate Elevated-Channel Thin-Film Transistors", IEEE Transactions on Electron Devices, vol. 45, No. 12, Dec. 1998.

Lidzey, D. G. et al., "Photoprocessed and Micropatterned Conjugated Polymer LEDs", Synthetic Metals, V. 82, 1996, pp. 141-148.

Lowe, J. et al., "Poly (3-(2-Acetoxyethyl)Thiophene): A Model Polymer for Acid-Catalyzed Lithography", Synthetic Metals, Elsevier Sequoia, Lausanne, CH, Bd. 85, 1997, Seiten 1427-1430.

Lu, Wen et al., "Use of Ionic Liquids for π-Conjugated Polymer Electrochemical Devices", Science, vol. 297, 2002, pp. 983-987.

Lucent Technologies, "Innovation marks significant milestone in the development of electronic paper", Cambridge, MA and Murray Hill, NJ, Nov. 20, 2000. XP-002209726.

Manuelli, Alessandro et al., "Applicability of Coating Techniques for the Production of Organic Field Effect Transistors", IEEE Polytronic 2002 Conference, 2002, pp. 201-204.

Marko, H., Vorlesungsmanuskript "Nachrichtentechnik 2 (Modulationsverfahren" des Lehrstuhls fur Nachrichtentechnik der Technischen Universitat Munchen, 1989.

Miyamoto, Shoichi et al:, Effect of LDD Structure and Channel Poly-Si Thinning on a Gate-All-Around TFT (GAT) for SRAM's, IEEE Transactions on Electron Devices. vol. 46, No. 8, Aug. 1999.

"Nachrichtentechnik 2 (Modulationsverfahren)" des Lehrstuhls fur Nachrichtentechnik der Technischen Universitat Munchen, 1989.

Oelkrug, D. et al., "Electronic spectra of self-organized oligothiophene films with 'standing' and 'lying' molecular units", Elsevier Science S.A., 1996, Thin Solid Films 284-270.

Qiao, X. et al., "The FeCl3-doped poly3-alkithiophenes) in solid state", Elsevier Science, Synthetic Metals 122 (2001) pp. 449-454.

Redecker, M. et al., "Mobility enhancement through homogeneous nematic alignment of a liquid-crystalline polyfluorene", 1999 American Institute of Physics, Applied Physics Letters, vol. 74, No. 10, pp. 1400-1402.

Rogers J A et al:, "Low-Voltage 0.1 Mum Organic Transistors and Complementary Inverter Circuits Fabricated with a Low-Cost Form of Near-Field Photolithography", Applied Physics Letters, American Institute of Physics. New York, US, Bd. 75, Nr. 7, Aug. 16, 1999, Seiten 1010-1012, XP000934355, ISSN: 003-6951, das ganze Dokument.

Rogers, J. A. et al:, "Printing Process Suitable for Reel-to-Reel Production of High-Performance Organic Transistors and Circuits", Advanced Materials, VCH, Verlagsgesellschaft, Weinheim, DE, Bd. 11, Nr. 9, Jul. 5, 1999, Seiten 741-745, P000851834, ISSN: 0935-9648, das ganze Dokument.

Roman et al., "Polymer Diodes With High Rectification", Applied Physics Letters, vol. 75, No. 21, Nov. 22, 1999.

Rost, Henning et al., "All-Polymer Organic Field Effect Transistors", Proc. Mat. Week, CD, 2001, pp. 1-6.

Sandberg, H. et al, "Ultra-thin Organic Films for Field Effect Transistors", SPIE vol. 4466, 2001, pp. 35-43.

Schoebel, "Frequency Conversion with Organic-On-Inorganic Heterostructured Diodes", Extended Abstracts of the International Conference on Solid State Devices and Materials, Sep. 1, 1997.

Shaheen, S.E., et al., "Low band-gap polymeric photovoltaic devices", Synthetic Metals, vol. 121, 2001, pp. 1583-1584.

Speakman, S.P. et al., High performance organic semiconducting thin films: Ink Jet printed polythophene [π-P3HT], Organic Electronics 2 (2), 2001, pp. 65-73.

Takashima, W. et al., Electroplasticity Memory Devices Using Conducting Polymers and Solid Polymer Electrolytes, Polymer International, Melbourne, 1992, pp. 249-253.

Ullman, A. et al., "High Performance Organic Field-Effect Transistors and Integrated Inverters", Mat. Res. Soc. Symp. Proc., v. 665, 2001, pp. 265-270.

Velu, G. et al. "Low Driving Voltages and Memory Effect in Organic Thin-Film Transistors With a Ferroelectric Gate Insulator", Applied Physics Letters, American Institute of Physics, New York, vol. 79, No. 5, 2001, pp. 659-661.

Yu, G. et al., "Dual-function semiconducting polymer devices: Light-emitting and photodetecting diodes", American Institute of Physics, Applied Physics Letter 64, Mar. 21, 1994, pp. 1540-1542.

Zangara L., "Metall Statt Halbleiter, Programmierung Von Embedded ROMS Ueber Die Metallisierungen", Elektronik, Franzis Verlag GmbH, Munchen, DE, vol. 47, No. 16, Aug. 4, 1998, pp. 52-55.

Zheng, Xiang-Yang et al., "Electrochemical Patterning of the Surface of Insulators with Electrically Conductive Polymers", J. Electrochem. Soc., v. 142, 1995, pp. L226-L227.

\* cited by examiner

IDENTIFICATION SYSTEM

The invention relates to an identification system, and to a security element in the form of a flexible, multilayer film body for use in an identification system.

It is known to provide merchandize, articles or security documents with information that can be read out electronically, by means of so-called RFID transponders (RFID=Radio Frequency Identification). Usually, such RFID transponders essentially comprise two components, an antenna and a silicon chip. Antenna and silicon chip are mounted on a common carrier substrate and electrically connected to one another by means of contact-connection. The RF carrier (RF—Radio Frequency) transmitted by the base station is fed back to the base station and an item of identification information is modulated onto the fed-back signal.

Furthermore, DE 101 41 440 C1 describes an RFID transponder constructed—with the exception of the antenna—substantially from organic components.

The carrier signal emitted by a base station is coupled into an antenna resonant circuit of the RFID transponder and the induced voltage is then rectified. The rectified voltage supplies a logic IC of the RFID transponder that drives a modulation transistor. The modulation transistor is driven by the logic IC with a bit sequence representing the identification information, so that the attenuation of the resonant circuit is modulated according to the binary signal. The antenna's radiating behavior that changes as a result of this is detected by the base station and acquired as response signal of the RFID transponder.

Organic circuits are significantly slower than conventional silicon-based circuits since organic semiconductors generally have lower charge carrier mobility than silicon and organic field effect transistors are based on the principle of charge carrier accumulation rather than on the principle of charge carrier inversion, which results in a lower switching speed in comparison with silicon transistors and a different switching behavior (e.g. unsuitability for AC voltage). This restricts the area of application of electronic circuits composed of organic components and demands novel circuit concepts—in comparison with conventional circuits based on silicon technology.

WO 00/07151 furthermore describes the application of RFID technology for safeguarding valuable documents, for example banknotes, checks, share certificates and the like. The output signal emitted by the RFID transponder and containing the items of identification information constitutes an authenticity feature and is checked in order to check the authenticity of the security document. The output signal emitted by the RFID transponder when the carrier frequency is coupled in contains e.g. the individual serial number of the security document, which is furthermore also printed on the security document. By checking these two items of information, it is ascertained whether or not the security document is a forgery.

EP 1 134 694 A1 likewise describes the application of a transponder to a security document. In this case, too, the transponder serves as a feature for identifying forgeries or for locating the document.

Furthermore WO 03/057501 A1 describes applying an electronic circuit to a valuable or security document, at least one element of the electronic circuit being printed onto the valuable or security document. In this case, this imprint can be effected by means of electrically conductive printing inks.

In this case, the electronic circuit has a power source in the form of a printed battery, solar cell or an antenna. The electronic circuit furthermore has an output device, for example an LED.

An apparatus for checking the valuable or security document detects the properties of the field emitted by said output device, compares the properties with predefined properties and thus determines whether or not the valuable or security document is genuine.

In a manner similar to that in the above-described application of an RFID transponder on a security document, an identification signal emitted by the security document is thus checked for the purpose of determining the authenticity of the security document.

In this case, what is disadvantageous about such methods is that checking the authenticity of the security documents can only be carried out with technically complicated apparatuses.

The invention is based on the object of specifying an improved identification system, in particular for identifying the authenticity of security documents.

This object is achieved by a security element in the form of a flexible, multilayer film body, which security element has a receiving unit for receiving an electromagnetic verification signal containing a specific coding from a verification device, an output unit for outputting an enable signal and an electronic release system constructed at least partly from active and/or passive organic components, wherein the electronic release system is configured in such a way that it checks whether or not a signal received by the receiving unit contains the specific coding, and drives the output unit for outputting the enable signal if the signal received by the receiving unit contains the specific coding. This object is furthermore achieved by an identification system comprising a verification device and at least one security element in the form of a flexible multilayer film body, in which the verification device is provided with a transmitting device for emitting an electromagnetic verification signal containing a specific coding, and the security element has a receiving unit for receiving the verification signal, an output unit for outputting an enable signal, and an electronic release system constructed at least partly from active and/or passive organic components, which electronic release system checks whether or not a signal received by the receiving unit contains the specific coding, and drives the output unit for outputting the enable signal if the signal received by the receiving unit contains the specific coding.

The invention makes it possible to provide security features which both afford a high degree of security against forgery and can be produced cost-effectively and can be checked for their authenticity with little expenditure in terms of time and costs. The checking of the security elements is configured in a particularly simple manner in this case. For example, it is not necessary to check a serial number that is output by the security element and, under certain circumstances, comprises a multiplicity of numerals. The checking of the security feature is feasible with little outlay, even for the layperson. The security element comprises a flexible, multilayer film body with active and/or passive organic components, so that imitation of the security feature by means of generally accessible technologies, for example by means of electronic circuits based on silicon technology, is only feasible with high outlay or at least immediately recognizable.

Furthermore, the invention affords the possibility by increasing the complexity of the verification device, of improving the security against forgery afterward without making changes in the security elements, for example by checking the reaction of the security element to changes in the verification signal. Consequently, increasing protection against forgeries does not necessitate replacing a multiplicity of security elements that are already in circulation. Furthermore, it is thereby possible to realize a gradated checking of the security feature depending on the respective requirements.

Advantageous configurations of the invention are presented in the subclaims.

The verification device can additionally be provided with sensor-technological elements for detecting influences such as pressure, temperature, moisture.

It is particularly advantageous if an optical output unit for outputting an optical enable signal is used as the output unit. The output unit has, by way of example, one or more electrochromic elements, thermochromic elements, electrophoretic elements or liquid crystalline elements (liquid crystal=LC) or organic light emitting diodes. The enable signal can thus be detected directly and unambiguously by the observer. Furthermore, it is also possible for the enable signal to be conveyed to the user acoustically or via the sense of touch for example by means of a piezoelement or a loudspeaker, olfactorily (e.g. sense of smell) or thermally (cooling or heating element). Furthermore, there is the possibility of outputting the enable signal as machine-readable information that can be detected by the verification device. It is possible, for example, to output as the enable signal an electromagnetic signal that can be detected by a receiver (antenna, photosensor, . . . ) of the verification device. An outputting of an electrical signal via conductive contacts is likewise possible. Furthermore, the abovementioned embodiment variants can be combined with one another.

The receiving unit of the security element preferably has an antenna structure comprising a structured electrically conductive layer for receiving the electromagnetic verification signal. In this case, the antenna structure is adapted in terms of its size and shaping to the coupling method and frequency range used by the verification signal. Furthermore, it is possible in this case, too, to provide two or more antennas for example for different frequencies. Frequency ranges that can be used are e.g. 125-135 MHz, 13-14 MHz, 6-8 MHz, 20-40 MHz, 860-950 MHz or 1.7-2.5 GHz. The electromagnetic coupling can be effected inductively, capacitively or by dipole interaction; this depends on the transmitter, the antenna and the distance between transmitter and antenna. RF sources used may be transmitters specially constructed for this or else RFID transmitters, mobile radio terminals, radio interfaces, RF television signals, and also infrared (IR) and UV sources.

Furthermore, it is also possible for the electromagnetic verification signal to lie in the range of visible light, in the infrared range or UV range, and for the receiving unit to be provided with corresponding sensors, for example a photodiode or solar cell, for receiving such electromagnetic radiation. Preferably, such sensors are at least partly constructed from organic layers.

The electronic release system preferably comprises one or more layers that comprise layers composed of organically conductive and/or semiconducting materials and are produced by printing technology. In this case, the electronic release system preferably comprises passive organic components, for example organic diodes, and also active organic components, for example organic field effect transistors or organic memory elements.

In one preferred exemplary embodiment of the invention, the electronic release system checks the signal received by the receiving unit in respect of whether the signal waveform of the signal corresponds to the specific coding. In the simplest case, for this purpose, the electronic release system checks the frequency and/or the amplitude of the received signal in respect of whether it corresponds to a predetermined value. In the simplest case, therefore, the coding is provided solely by a specific largely fixed RF carrier frequency. Thus, the electronic release system determines, for example by means of a bandpass filter and a window discriminator connected downstream, whether the received signal has signal components (of a predetermined field strength) in a predetermined frequency range. By connecting a plurality of such circuits in parallel, which, under certain circumstances, are connected to one another by means of a logic gate, it is possible to check the presence of complex signal waveforms using organic components.

Furthermore, it is possible for the electronic release system to check the signal received by the receiving unit in respect of the direction from which the signal impinges on the security element, and to drive the output unit for outputting the enable signal only when the signal received by the receiving unit impinges on the security element from a predetermined direction. It is thus possible, for example, for the receiving unit to have a plurality of antenna structures which are arranged in a phased array arrangement and are connected to the electronic release system. After evaluation of the signals received by the various antenna structures, it is possible for the electronic release system to determine the direction of incidence of the verification signal. The enable signal is output only when the security element is held in a specific position with respect to the verification device. If the security element is rotated, for example, then an organic light emitting diode or any other output element that outputs an enable signal lights up only at a specific angular position with respect to the verification device.

In accordance with a further advantageous exemplary embodiment of the invention, the enable signal is output only when a predetermined combination of different types of input signals that can be detected is present. The verification signal thus comprises a specific combination of different types of input signals, for example RF+light, light+pressure or RF, IR+temperature. The electronic release system checks the combination of the input signals in respect of whether or not it contains the specific coding, e.g. the specific combination, and drives the output unit accordingly.

In accordance with a further preferred exemplary embodiment of the invention, the electronic release system checks the signal received by the receiving unit in respect of whether the change in the signal waveform of the signal corresponds to the specific coding. Thus, the electronic release system checks, by way of example, whether the change in the frequency, the phase and/or the amplitude of the received signal corresponds to predetermined values. By way of example, the electronic release system determines, by means of the assembly described above, at specific time intervals, the signal strength in specific frequency bands, compares the latter with specific threshold values and stores the signal thus obtained in a shift register serving as a buffer. By comparing the signal pattern stored in the shift register with a signal pattern stored in an organic memory, it is then determined whether the change in the signal waveform of the received signal corresponds to the specific coding.

Furthermore, it is also possible for the electronic release system to demodulate the signal received by the receiving unit and to check a code word contained in the demodulated signal in respect of whether it corresponds to the specific coding. The signal received by the receiving unit is thus fed to a low-pass filter, for example, converted into a binary signal and compared with a predetermined code stored in an organic memory.

The security element furthermore has a power supply unit for feeding the electronic release system and the output unit. The power supply unit comprises, by way of example, a battery, a solar cell, or else an antenna with downstream rectification and storage capacitor for coupling in radiated-in HF power (HF=High Frequency).

Furthermore, different power supply units can also be combined, e.g. rechargeable batteries with solar cells. It is advantageous in this case to integrate all these elements in the multilayer film body.

Furthermore, it is also possible for the security element optionally to have a sensor unit by means of which, by way of example, pressure, temperature or moisture are detected and fed as input signal to the electronic release system. The enable signal is then also emitted in a manner dependent on the values determined by said sensors.

The invention is explained below by way of example on the basis of a plurality of exemplary embodiments with the aid of the accompanying drawings.

Figure 1:
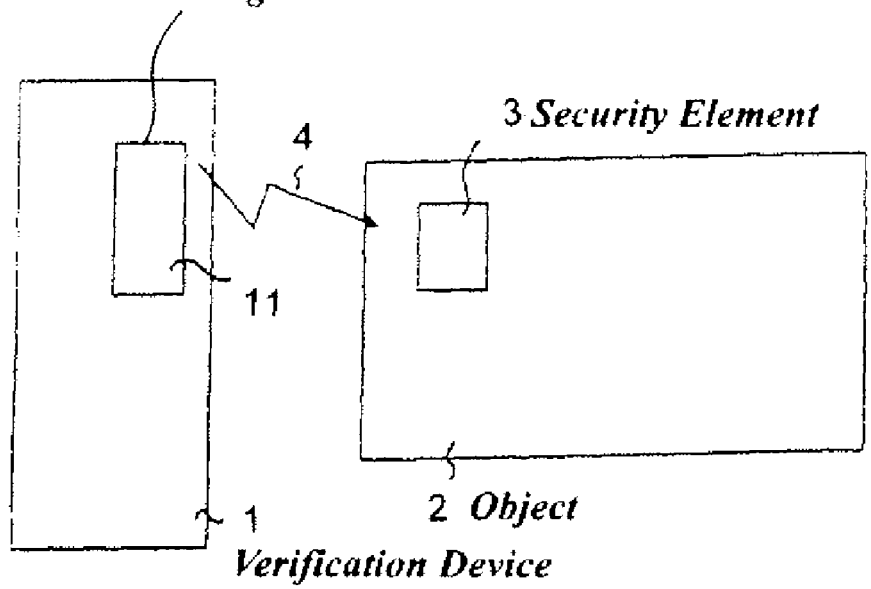
FIG. 1 shows a schematic illustration of an identification system according to the invention with a verification device and a security element.

FIG. 1 shows an identification system comprising a verification device 1, comprising an object 2 to be safeguarded, and comprising a security element 3.

The object 2 to be safeguarded is a security document such as, for example, an ID document or a banknote, a product, a product packaging or product wrapping. The security element 3 is applied to the object 2 to be safeguarded for example by hot embossing, lining, adhesive bonding or laminating. The security element 3 is thus applied for example to a carrier material of the object to be safeguarded or to the product surface itself, for example to paper, cardboard, coated paper, a plastic, a plastic film e.g. made of polyester or PVC, or a coated film. Furthermore, it is also possible for the security element 3 to be integrated into the object to be safeguarded, for example by laminating the security element in between two plastic layers of the object to be safeguarded.

The security element 3 comprises a multilayer, flexible film body comprising one or more electrical functional layers. The electrical functional layers of the film body comprise (organically) conductive layers, organically semiconducting layers, and/or organic insulator layers, which are arranged one above another, at least partly in structured form. Alongside said electrical functional layers, the multilayer film body optionally also comprises one or more carrier layers, protective layers, decorative layers, adhesion promoting layers or adhesive layers.

The electrically conductive functional layers preferably comprise a conductive, structured metallization, preferably made of gold or silver. However, provision may also be made for forming said functional layers from an inorganic electrically conductive material, for example indium tin oxide, or a conductive polymer, for example polyaniline or polypyrrole.

The organic semiconducting functional layers comprise for example conjugated polymers such as polythiophenes, polythienylene vinylenes or polyfluorene derivatives, which are applied from solution by spin-coating, blade coating or printing. So-called "small molecules", that is to say oligomers such as sexithiophene or pentacene, which are vapor-deposited by means of a vacuum technique are also suitable as organic semiconductor layer. These organic layers are preferably applied already in a partially structured manner or in a manner structured in patterned fashion by means of a printing method (intaglio printing, screen printing, pad printing). For this purpose, the organic materials provided for the layers are formed as soluble polymers, where the term polymer in this case, as already described further above, also includes oligomers and "small molecules".

The verification device 1 has a transmitting device 11, which emits an electromagnetic verification signal 4 containing a specific coding. The verification device 1 may be a specific device developed for checking the authenticity of the security element 3. However, it is also possible for the verification device to be a device that is only additionally used for this purpose. Thus, the verification device 1 may be, by way of example, a mobile radio terminal, computer or PDA (=Personal Digital Assistant). In this case, the transmitting device is formed by a GSM/UMTS transceiver or a transceiver for a radio interface for the near range, for example Bluetooth.

Figure 2:
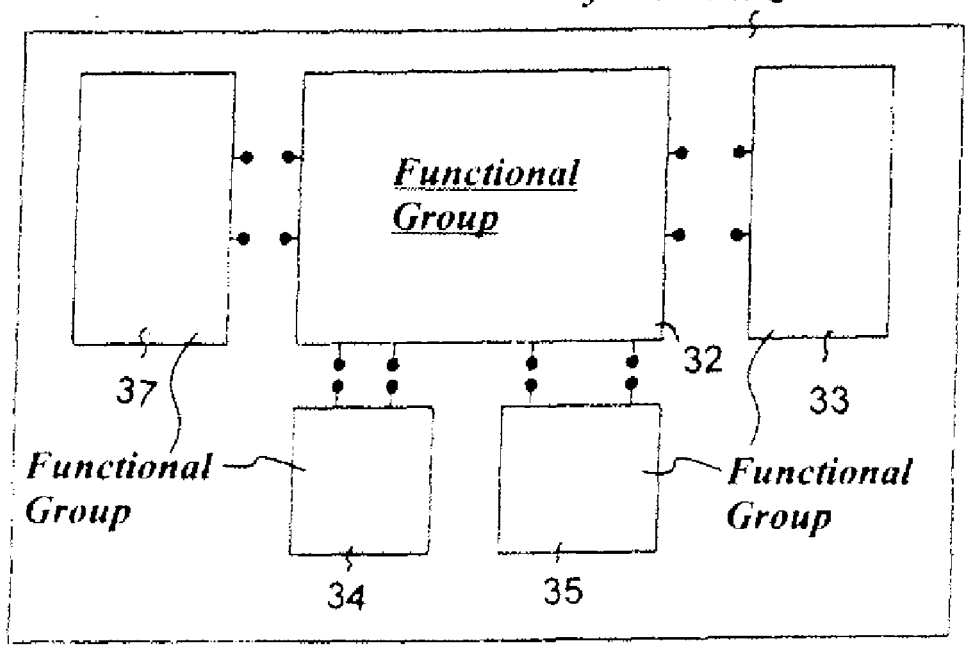
FIG. 2 shows a block diagram of the security element according to FIG. 3.

As a result of the interaction of the electrical functional layers of the security element 3, the electrical functions of the security element 3 that are described below with reference to FIG. 2 are provided when the electromagnetic verification signal 4 impinges on the security element 3.

FIG. 2 shows an electrical-functional schematic illustration of the security element 3 with various electrical functional groups 31 to 35 implemented in the security element 3.

As indicated in FIG. 2, the functional groups 31 to 35 preferably form separate systems that are connected to one another via electrical contact points.

The electrical functional group 31 is a receiving unit 31 for receiving the verification signal 4. If an RF signal is used as the verification signal 4, then the functional group 31 comprises an antenna structure adapted to the frequency range and the intended coupling method of the verification signal 4. Said antenna structure is formed by one or more structured, electrically conductive layers or layer regions of the multilayer flexible film body.

The electrical functional group 34 has one or more sensors that detect additional input signals. In this case, said sensors detect for example pressure, temperature, visible light, UV radiation or IR radiation and forward an electrical signal that represents the detected quantities to the functional group 34. The functional group 34 could also be dispensed with.

The electrical functional group 35 is a power supply unit. The electrical functional group 35 can also be dispensed with if the power of the verification signal 4 that is coupled into the functional group 31 is used for operating the rest of the functional groups 32, 33 and, under certain circumstances, 34.

The electrical functional group 33 is an output unit 33 for outputting an enable signal. The functional group 33 preferably comprises an electrochromic element, a thermochromic element, an electroluminescent element, an electrophosphorescent element, a liquid crystal element or an organic light emitting diode, which output an optical enable signal in response to a corresponding electrical input signal. The electrical functional group 33 is thus generally formed by three or more layers or layer regions of the flexible multilayer film body that lie one above another and comprise two structured electrically conductive electrode layers and at least one optically active layer lying in between. In this case, it is also possible for the electrical functional group 33 to have two or more interconnected elements of this type. In addition, the functional group 33 can also have a piezoelement for generating a sound signal or a signal that can be detected by tactile means, and/or an element for generating a signal that can be detected thermally or by the sense of smell.

The electrical functional group 32 is an electronic release system comprising one or more active and/or passive, interconnected organic components. The electrical functional group 32 is thus formed by at least three layers or layer regions of the flexible multilayer film body that lie one above another and have at least two structured electrically conductive electrode layers and at least one electrical functional layer lying in between. One or more active and/or passive, interconnected organic components are thereby formed. In this case, the electronic release system preferably comprises passive organic components, for example organic diodes, and also active organic components, for example organic field effect transistors or organic memory elements.

The electronic release system realized by the interconnection of the electrical components of the functional group 32 checks whether or not a signal received by the functional group 31 contains the specific coding, and drives the functional group 33 for outputting the enable signal if the signal received by the functional group 31 contains the specific coding.

In the simplest case, the functional group 32 together with the functional group 31 forms a selective resonant circuit which is formed by an antenna and an organic capacitor and which can only be excited with an entirely specific frequency/frequency bandwidth. For the case of the suitable frequency, an optical element of the functional group is altered by current or voltage applied by the functional group 33. Preferably, the optical element is in this case altered by a DC current or a DC voltage, which are generated by organic components, e.g. an organic diode. In this case, the functional group 32 can furthermore have an organic field effect transistor which is connected up as a window discriminator and which drives the functional group 32. In this case, said organic field effect transistor can furthermore be connected to one or more upstream organic components that realize a further bandpass filter, to an additional coupling antenna serving for power supply or selection of further frequencies, or to some other power supply.

Figure 3:
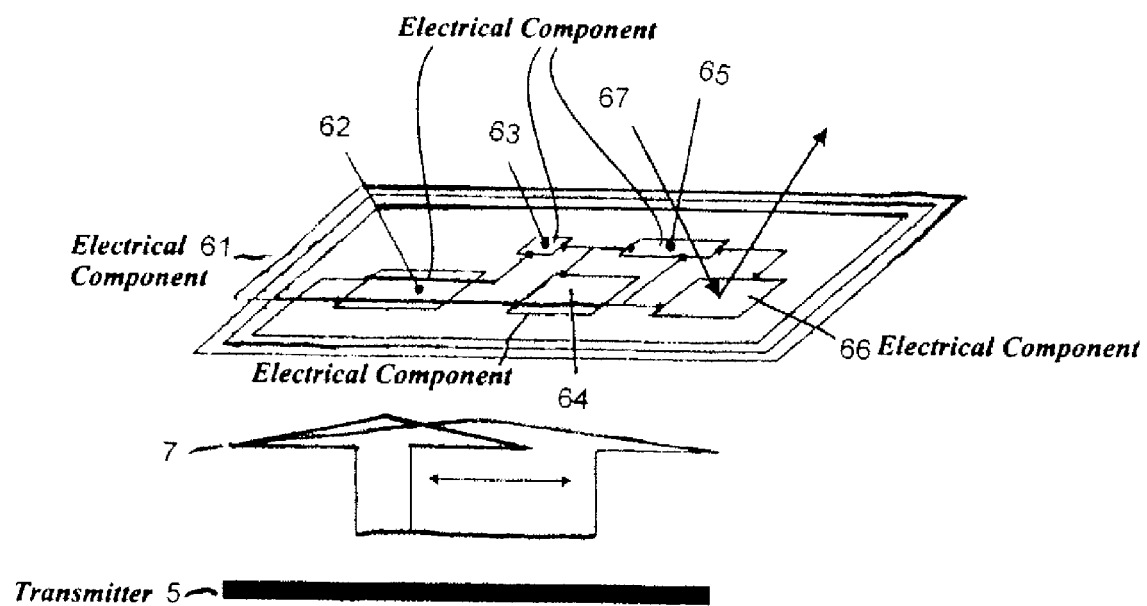
FIG. 3 shows a schematic illustration of the construction of a security element according to the invention.

FIG. 3 shows a schematic illustration of a further electrical-functional configuration of the security element 3.

FIG. 3 shows a transmitting device 5, a verification signal 5 and a plurality of electrical components 61 to 66 that are connected to one another and implemented by the interaction of the electrical functional layers of the multilayer film body. The illustration chosen in FIG. 3 indicates the spatial arrangement of these electrical components with respect to a vertical sectional plane of the multilayer film body.

The component 61 is an antenna. The component 62 is an organic capacitor. The components 63 and 64 form an organic rectifier having e.g. an organic diode and an organic field effect transistor. The component 65 is an organic circuit element that implements a logic operation.

As indicated in FIG. 3, the signal waveform, here the amplitude, of the electromagnetic signal emitted by the transmitting device 5 onto the security element changes.

The selective resonant circuit formed by the components 61 and 62 is designed in such a way that it can be excited by the transmitter 5 only with a specific frequency or within a specific, narrowly limited frequency band. The voltage present at the resonant circuit is tapped off via the organic rectifier and fed to the organic circuit element 65. The specific code word that is contained in the signal 7 in coded fashion by means of amplitude modulation is checked by the organic circuit element 65 in respect of whether it corresponds to a predetermined code word preferably stored in an organic memory. This checking is preferably realized by means of a shift register and a comparator—connected to the latter and the organic memory—with an organic field effect transistor that is connected downstream and functions as a driver. If this is the case, then a current or a voltage is applied to the component 66, which is an optical element. By virtue of the applied current or the applied voltage, the optical properties of the component 66 change, such that an enable signal discernible to the user is coded into the light reflected by the component 66.

The invention claimed is:

1. A security element in the form of a flexible multilayer film body, comprising:
    a receiving unit for receiving an electromagnetic verification signal containing a specific coding from a verification device;
    an output unit for outputting an enable signal; and
    an electronic release system having active and/or passive organic components, wherein the electronic release system is configured to check whether or not a signal received by the receiving unit contains the specific coding, and drives the output unit for outputting the enable signal if the signal received by the receiving unit contains the specific coding, and in that the output unit has at least one electrochromic element, a thermochromic element, an electroluminescent element, an electrophoretic element, a liquid crystal element or an organic light emitting diode;
    wherein the electronic release system is further configured to check the signal received by the receiving unit in respect of the direction from which the signal impinges on the security element, and drives the output unit for outputting the enable signal if the signal received by the receiving unit impinges on the security element from a predetermined direction.

2. The security element as claimed in claim 1 wherein the output unit has a piezoelement for generating a sound signal or a signal that can be detected by a tactile device.

3. The security element as claimed in claim 1, wherein the output unit is configured for generating a signal that can be detected thermally or by the sense of smell.

4. The security element as claimed in claim 1 wherein the receiving unit comprises an antenna structure comprising a structured electrically conductive layer for receiving the electromagnetic verification signal.

5. The security element as claimed in claim 1 wherein the electronic release system is configured to check the signal received by the receiving unit in respect of whether the signal waveform of the received signal corresponds to a specific coding comprising the frequency and/or the amplitude of the signal of a predetermined value.

6. The security element as claimed in claim 1 wherein the electronic release system comprises one or more layers that are composed of organic conductive and/or semiconducting materials and are produced by printing technology.

7. The security element as claimed in one of the preceding claims, wherein the receiving unit, the output unit and the electronic release system form separate systems that are connected to one another via electrical contact points.

8. An identification system, comprising: a verification device with a transmitting unit for emitting an electromagnetic verification signal containing a specific coding; and
    at least one security element in the form of a flexible, multilayer film body, which security element contains a receiving unit for receiving the verification signal, an output unit for outputting an enable signal and an electronic release system having active and/or passive organic components, wherein the electronic release system is configured in such a way that it checks whether or not a signal received by the receiving unit contains the specific coding, and drives the output unit for outputting the enable signal if the signal received by the receiving unit contains the specific coding, and in that the output unit has at least one electrochromic element, a thermochromic element, an electroluminescent element, an electrophoretic element, a liquid crystal element or an organic light emitting diode.

9. A security element in the form of a flexible multilayer film body, comprising:

a receiving unit for receiving an electromagnetic verification signal containing a specific coding from a verification device;

an output unit for outputting an enable signal; and an electronic release system having active and/or passive organic components, wherein the electronic release system is configured to check whether or not a signal received by the receiving unit contains the specific coding, and drives the output unit for outputting the enable signal if the signal received by the receiving unit contains the specific coding, and in that the output unit has at least one electrochromic element, a thermochromic element, an electroluminescent element, an electrophoretic element, a liquid crystal element or an organic light emitting diode;

wherein the electronic release system is configured to check the signal received by the receiving unit in respect of whether the change in the signal waveform of the signal corresponds to the specific coding comprising a change in the frequency, phase and/or the amplitude of the signal corresponding to predetermined values.

10. The security element as claimed in claim 9 wherein the output unit has a piezoelement for generating a sound signal or a signal that can be detected by a tactile device.

11. The security element as claimed in claim 10 wherein the electronic release system is configured to check the signal received by the receiving unit in respect of whether the signal waveform of the received signal corresponds to a specific coding comprising the frequency and/or the amplitude of the signal of a predetermined value.

12. The security element as claimed in claim 10 wherein the electronic release system comprises one or more layers that are composed of organic conductive and/or semiconducting materials and are produced by printing technology.

13. A security element in the form of a flexible multilayer film body, comprising:

a receiving unit for receiving an electromagnetic verification signal containing a specific coding from a verification device;

an output unit for outputting an enable signal;

an electronic release system having active and/or passive organic components, wherein the electronic release system is configured to check whether or not a signal received by the receiving unit contains the specific coding, and drives the output unit for outputting the enable signal if the signal received by the receiving unit contains the specific coding, and in that the output unit has at least one electrochromic element, a thermochromic element, an electroluminescent element, an electrophoretic element, a liquid crystal element or an organic light emitting diode;

wherein the electronic release system is further configured to check the signal received by the receiving unit in respect of whether a code word contained in the modulated signal corresponds to the specific coding as to whether said code word matches a predetermined code word stored in a memory of the security element; and wherein the electronic release system is further configured to check the signal received by the receiving unit in respect of whether the signal waveform of the received signal corresponds to a specific coding comprising the frequency and/or the amplitude of the signal of a predetermined value.

14. The security element as claimed in claim 13 wherein the output unit has a piezoelement for generating a sound signal or a signal that can be detected by a tactile device.

15. The security element as claimed in claim 13 wherein the electronic release system comprises one or more layers that are composed of organic conductive and/or semiconducting materials and are produced by printing technology.

16. A security element in the form of a flexible multilayer film body, comprising:

a receiving unit for receiving an electromagnetic verification signal containing a specific coding from a verification device;

an output unit for outputting an enable signal;

an electronic release system having active and/or passive organic components, wherein the electronic release system is configured to check whether or not a signal received by the receiving unit contains the specific coding, and drives the output unit for outputting the enable signal if the signal received by the receiving unit contains the specific coding, and in that the output unit has at least one electrochromic element, a thermochromic element, an electroluminescent element, an electrophoretic element, a liquid crystal element or an organic light emitting diode;

wherein the security element includes a power unit for applying power to said output unit and electronic release system; and wherein the electronic release system is further configured to check the signal received by the receiving unit in respect of whether the signal waveform of the received signal corresponds to a specific coding comprising the frequency and/or the amplitude of the signal of a predetermined value.

17. The security element as claimed in claim 16 wherein the output unit has a piezoelement for generating a sound signal or a signal that can be detected by a tactile device.

18. The security element as claimed in claim 16 wherein the electronic release system comprises one or more layers that are composed of organic conductive and/or semiconducting materials and are produced by printing technology.

19. A security element in the form of a flexible multilayer film body, comprising:

a receiving unit for receiving an electromagnetic verification signal containing a specific coding from a verification device;

an output unit for outputting an enable signal; and an electronic release system having active and/or passive organic components, wherein the electronic release system is configured to check whether or not a signal received by the receiving unit contains the specific coding, and drives the output unit for outputting the enable signal if the signal received by the receiving unit contains the specific coding, and in that the output unit has at least one electrochromic element, a thermochromic element, an electroluminescent element, an electrophoretic element, a liquid crystal element or an organic light emitting diode;

wherein the security element includes a sensor unit for sensing any one of a plurality of different parameters and feeding the sensed parameter as an input to the release system.

* * * * *